United States Patent [19]

Sugiyama

[11] Patent Number: 4,945,621

[45] Date of Patent: Aug. 7, 1990

[54] DEVICE FOR ASSEMBLING A CONNECTOR TO A TUBE

[75] Inventor: Kenji Sugiyama, Numazu, Japan

[73] Assignee: Usui Kokusai Sangyo Kaisha Ltd., Shizuoko, Japan

[21] Appl. No.: 415,119

[22] Filed: Sep. 28, 1989

[51] Int. Cl.$^5$ .............................................. B23P 19/04
[52] U.S. Cl. ................................................................. 29/237
[58] Field of Search ................. 72/409, 410, 452, 472, 72/433, 434, 402, 416, 415, 407; 29/235, 237, 243.52, 282; 269/43, 224

[56] References Cited

U.S. PATENT DOCUMENTS

| | | | |
|---|---|---|---|
| 3,744,114 | 7/1973 | Melsom | 29/237 |
| 3,777,354 | 12/1973 | Masters | 29/237 |
| 3,963,230 | 6/1976 | Jankowski | 269/224 |
| 4,276,765 | 7/1981 | Yoneda | 29/237 |
| 4,408,381 | 10/1983 | Kish | 29/237 |
| 4,785,656 | 11/1988 | Kennedy | 29/237 |

Primary Examiner—Robert C. Watson
Attorney, Agent, or Firm—Anthony J. Casella; Gerald E. Hespos

[57] ABSTRACT

A device for assembling a connector to a tube includes a pair of clamping blocks provided with a pair of holding grooves, respectively, the holding grooves having a substantially semicircular sectional configuration and arranged in face-to-face relationship; and two-split type chuck members adapted to hold the clamping blocks via a resilient member formed of a rubber or resin member disposed on the rear surface of each of the clamping blocks, the chuck members being provided with a pair of clamping grooves which are aligned concentrically with the holding grooves, respectively. At least one of the chuck members is arranged to be movable in a transverse opposite direction thereto.

5 Claims, 1 Drawing Sheet

DEVICE FOR ASSEMBLING A CONNECTOR TO A TUBE

BACKGROUND OF THE INVENTION

1. Field of the Invention:

The present invention relates to a device for assembling a connector to an end of a tube which is a resin tube having a relatively small diameter of about 20 mm or less and laid as a supply line for supplying oil or gas in automobiles in general or various types of machine and equipment.

2. Description of the Related Art:

As shown in FIG. 5, this type of device for assembling a connector to a tube is conventionally arranged such that two-split type chuck members 11, 11' are provided with a pair of clamping grooves 13, 13' arranged to face each other, and enlarged-diameter portions 12 of the clamping grooves of the chuck members 11, 11' on the front side thereof have a diameter slightly greater than a size in which the thickness of a resin tube T' is added to the outside diameter of a projecting corrugated cylindrical wall portion of the connector to be connected over a certain length thereof. In operation, with a portion of the resin tube T' adjacent to an end thereof being clamped by peripheral surfaces of the clamping grooves 13, 13', the corrugated cylindrical wall portion of the connector is forcedly inserted into an end portion of the tube manually or automatically by using an actuator or the like, thereby effecting the assembly.

With this conventional assembling device, however, in the state in which the resin tube T' is clamped by the peripheral surfaces of the clamping grooves 13, 13', a gap is produced between the resin tube T' and the inner peripheral surfaces of the enlarged-diameter portions 12 of the clamping grooves 13, 13' extending over a certain length on the tube end side. As a result, at the time when the corrugated cylindrical wall portion of the connector is forcedly inserted into the resin tube T' during assembly, the central axis of the end of the resin tube T' tends to be misaligned with the central axis of the corrugated cylindrical wall portion due to the presence of the gap. In addition, unstable displacement or bending tends to occur to the end of the tube which is soft and hence liable to bend. Consequently, there have been drawbacks that buckling of the tube end and faulty assembly can occur, involving a cumbersome centering operation. Thus, much time and labor have been involved in the assembling operation, causing a decline in the work efficiency.

SUMMARY OF THE INVENTION

Accordingly, an object of the present invention is to provide a device for assembling a connector to a tube which allows the connector to be forcedly inserted into a tube end in a simple manner by eliminating the cumbersome operation of centering the tube end so as to effect a smooth and speedy assembling operation, thereby overcoming the above-described drawbacks of the conventional art.

To this end, in accordance with the present invention, there is provided a device for assembling a connector to a tube, comprising: a pair of clamping blocks provided with a pair of holding grooves, respectively, the holding grooves having a substantially semicircular sectional configuration and arranged in face-to-face relationship; two-split type chuck members adapted to hold the clamping blocks via a resilient member formed of a rubber or resin member disposed on the rear surface of each of the clamping blocks, the chuck members being provided with a pair of clamping grooves which are aligned concentrically with the holding grooves, respectively; and moving means for moving at least one of the chuck members in a transverse opposite direction thereto.

By virtue of the above-described arrangement, even if the resin tube clamped by the chuck members is curved, the curvature is corrected, and the tube end is brought into contact with peripheral surfaces of the holding grooves of the clamping blocks arranged concentrically with the tube. As a result, the central axis of the tube end is positively aligned with that of the tip of a corrugated cylindrical wall portion of the connector, whereby the corrugated cylindrical wall portion can be inserted smoothly into the tube end. As the cylindrical wall portion is further forcedly inserted into the tube end, since the resilient member is interposed on the rear surface of each clamping block, the cylindrical wall portion is inserted against the resiliency of the resilient members with the tube end set in a restrained state over the entire periphery thereof. Consequently, the cylindrical wall portion can be inserted into the tube end without any occurrence of abnormal displacement of the tube end.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a description will be given of a preferred embodiment of the present invention.

Figure 1:
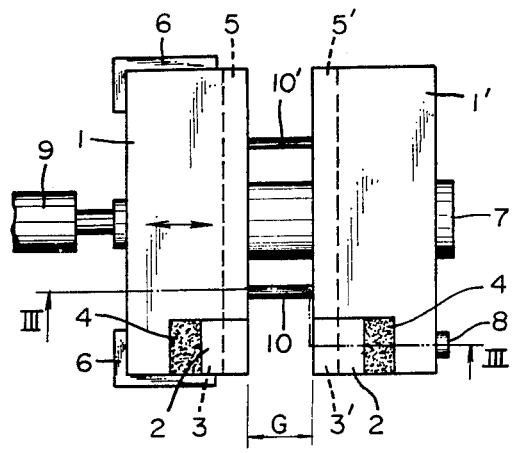
FIG. 1 is a top plan view of an assembling device in accordance with an embodiment of the present invention.
Figure 2:
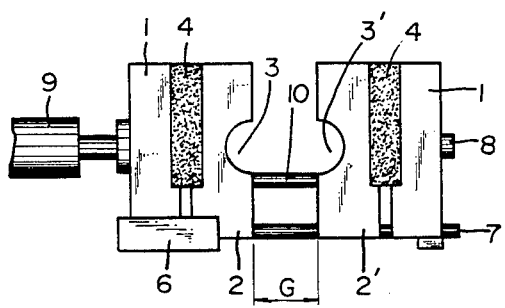
FIG. 2 is a front elevational view of FIG. 1.
Figure 3:
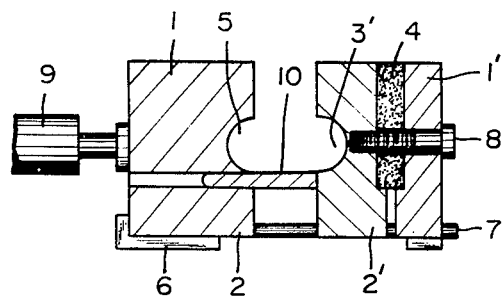
FIG. 3 is a cross-sectional view taken along the line III—III of FIG. 1.
Figure 4:
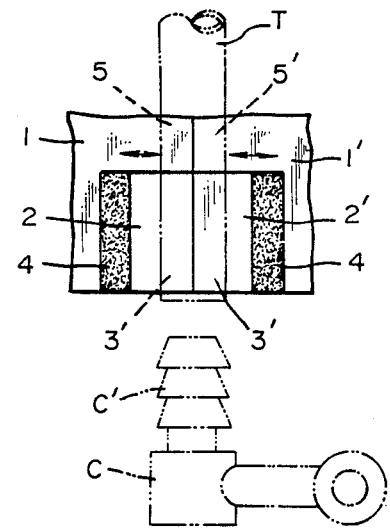
FIG. 4 is an enlarged top plan view, partly in section, of an essential portion of the assembling device in accordance with the present invention.
Figure 5:
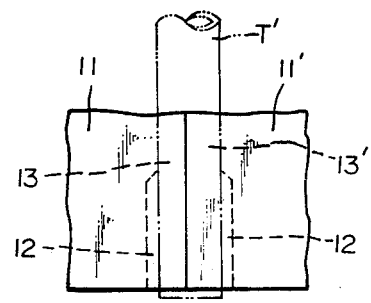
FIG. 5 is a top plan view, partly in section, of a conventional assembling device.

In FIGS. 1 to 4, chuck members 1, 1' of a two-split type are juxtaposed in face-to-face relationship. A pair of clamping blocks 2, 2' are provided with a pair of grooves 3, 3', respectively, which have a substantially semicircular sectional configuration and are arranged in face-to-face relationship on the opposing surfaces of the clamping blocks 2, 2' on the front sides thereof. The clamping blocks 2, 2' are held by the chuck members 1, 1' via an elastic member 4 formed of a rubber or resin material and disposed on the rear surface of each clamping block. In addition, a pair of clamping grooves 5, 5' are respectively provided on the opposing surfaces of the chuck members 1, 1' on the rear sides thereof in coaxial alignment with the grooves 3, 3'. To ensure that at least one of the chuck members is movable along the guides 6 transversely in an opposite direction, a pair of L-shaped guides 6 are provided on the underside of that one chuck member (designated at 1 in the illustrated case) and are fixed to a base, the chuck member 1 being connected to an external operating cylinder 9. A guide plate 7 is provided on and engages with bottom surfaces of the chuck members 1, 1'. A guide pin 8 is provided through the other chuck member 1' and engages with both the elastic member 4 and the clamping block 2' by penetrating the same. In FIG. 4, reference character T denotes a resin tube, while C denotes a connector having an annular corrugated cylindrical wall portion C' for assembly projecting therefrom. A pair of support pins 10, 10' secured to one chuck member and extending through respective holes bored in the other chuck member are adapted to prevent the resin tube from falling down when the resin tube is inserted into a gap G between the chuck members 1, 1' spaced apart from each other. A double-headed arrow of the solid line in FIG. 1 shows the direction of transverse movement of one chuck member 1, while double headed arrows in FIG. 4 denote the direction of transverse displacement of the clamping blocks 2, 2' occurring as the corrugated cylindrical wall portion C' is forcedly inserted into the tube end.

A description will now be given of the operation of the device in accordance with the present invention. First, the chuck members 1, 1' are set spaced apart from each other with the gap G which is greater than the outside diameter of the resin tube T, and the resin tube is then inserted into the gap G. At this juncture, the resin tube is prevented from falling down by means of the support pins 10, 10'. After an end portion of the resin tube T is thus placed between the opposing surfaces of the chuck members 1, 1', the cylinder 9 is operated to move the chuck member 1 in a direction in which the opposing surfaces of the chuck members 1, 1' are brought into contact with each other. Thus, the end portion of the resin tube T is clamped by peripheral surfaces of the clamping grooves 5, 5' of the chuck members 1, 1' and the grooves 3, 3' of the clamping blocks 2, 2'. In this state, the corrugated cylindrical wall portion C' is forcedly inserted into the end of the tube T by operating an actuator (not shown) provided in such a manner as to hold the connector C. Due to this forced insertion, the clamping blocks 2, 2' are displaced transversely against the resiliency of the resilient members 4 interposed on the rear surfaces thereof, respectively, so that the outside of the tube is held in a fixedly restrained state by the aforementioned resiliency. As a result, the corrugated cylindrical wall portion C' of the connector C is inserted smoothly into the interior of the end portion of the tube T without said end portion becoming eccentric or buckling.

Alternatively, it is possible to provide an arrangement in which, by fixing the connector C' the chuck members 1, 1' clamping the resin tube may be moved toward the connector C. In addition, if the length of the resin tube T is made substantially identical with the length of the chuck members 1, 1', and the clamping blocks 2, 2' and the resilient members 4 are provided on both opposite sides of the chuck members 1, 1', it is possible to simultaneously assemble a pair of connectors to respective opposite end portions of the tube T.

As described above, the device for assembling a connector to a tube in accordance with the present invention holds the end portion of the resin tube T by means of the peripheral surfaces of the grooves 3, 3' of the clamping blocks 2, 2' in abutment with the substantially entire periphery thereof, and the resilient members 4 are interposed on the rear surfaces of the clamping blocks, respectively. Accordingly, when the connector C is assembled, even if the tube is, for instance, soft and curved, the central axis of the end portion of the tube and that of the corrugated cylindrical wall portion C' are automatically aligned with each other since the end portion of the tube is clamped on the entire peripheral portion thereof. At the same time, since the end portion of the tube is prevented from moving, the troublesome centering can be dispensed with, so that the assembling operation can be effected smoothly and speedily without any buckling of the tube due to the simple forced insertion of the connector C. Thus, the device for assembling a connector to a tube in accordance with the present invention is very useful.

What is claimed is:

1. A device for assembling a connector to a tube comprising:
    a pair of clamping blocks provided with a pair of holding grooves, respectively, said holding grooves having a substantially semicircular sectional configuration and arranged in face-to-face relationship;
    two-split type chuck members adapted to hold said clamping blocks via a resilient member disposed on the rear surface of each of said clamping blocks, said chuck members being provided with a pair of clamping grooves which are aligned concentrically with said holding grooves, respectively;
    a support pin projecting from one of said chuck members immediately below said holding groove and fitting into a hole bored in the outer chuck member; and
    moving means for moving at least one of said chuck members in a transverse opposite direction thereto.

2. A device according to claim 1, wherein said pair of clamping blocks are provided on opposite end portions of said chuck members, respectively.

3. A device according to claim 1, wherein said resilient member is formed of a rubber or resin material.

4. A device according to claim 1, wherein said moving means comprises means for fixing one of said chuck members, guide means provided on said chuck members, and cylinder means for pressing one of said chuck members toward the other.

5. A device according to claim 1, wherein each of said clamping blocks is held by a corresponding one of said chuck members by means of a guide pin extending through said chuck member into clamping block via said resilient member.

* * * * *